Nov. 14, 1950     M. L. BRYER     2,529,795
VALVE
Filed Sept. 26, 1947     2 Sheets-Sheet 1
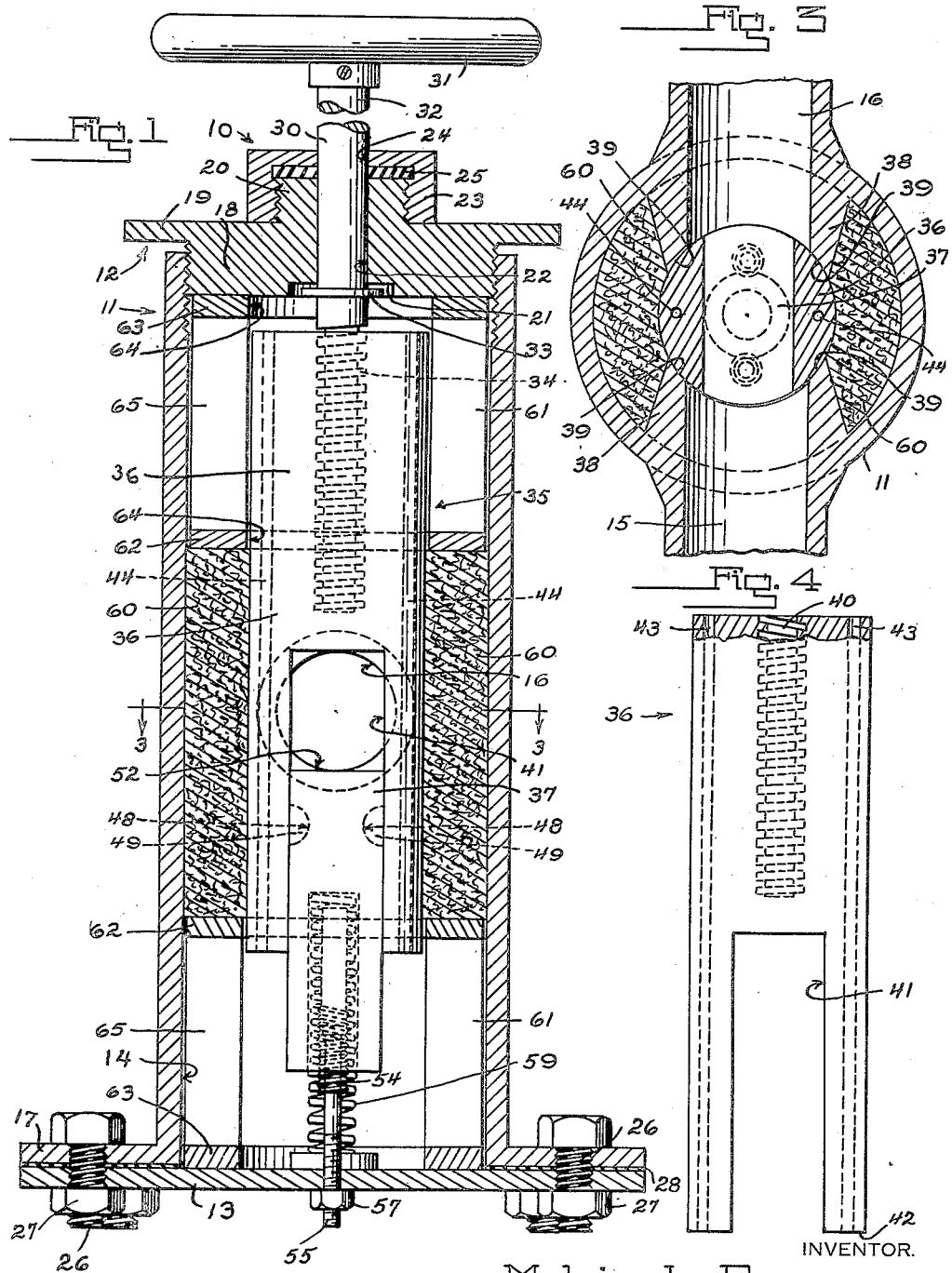
INVENTOR.
Melvin L. Bryer
BY
ATTORNEYS.

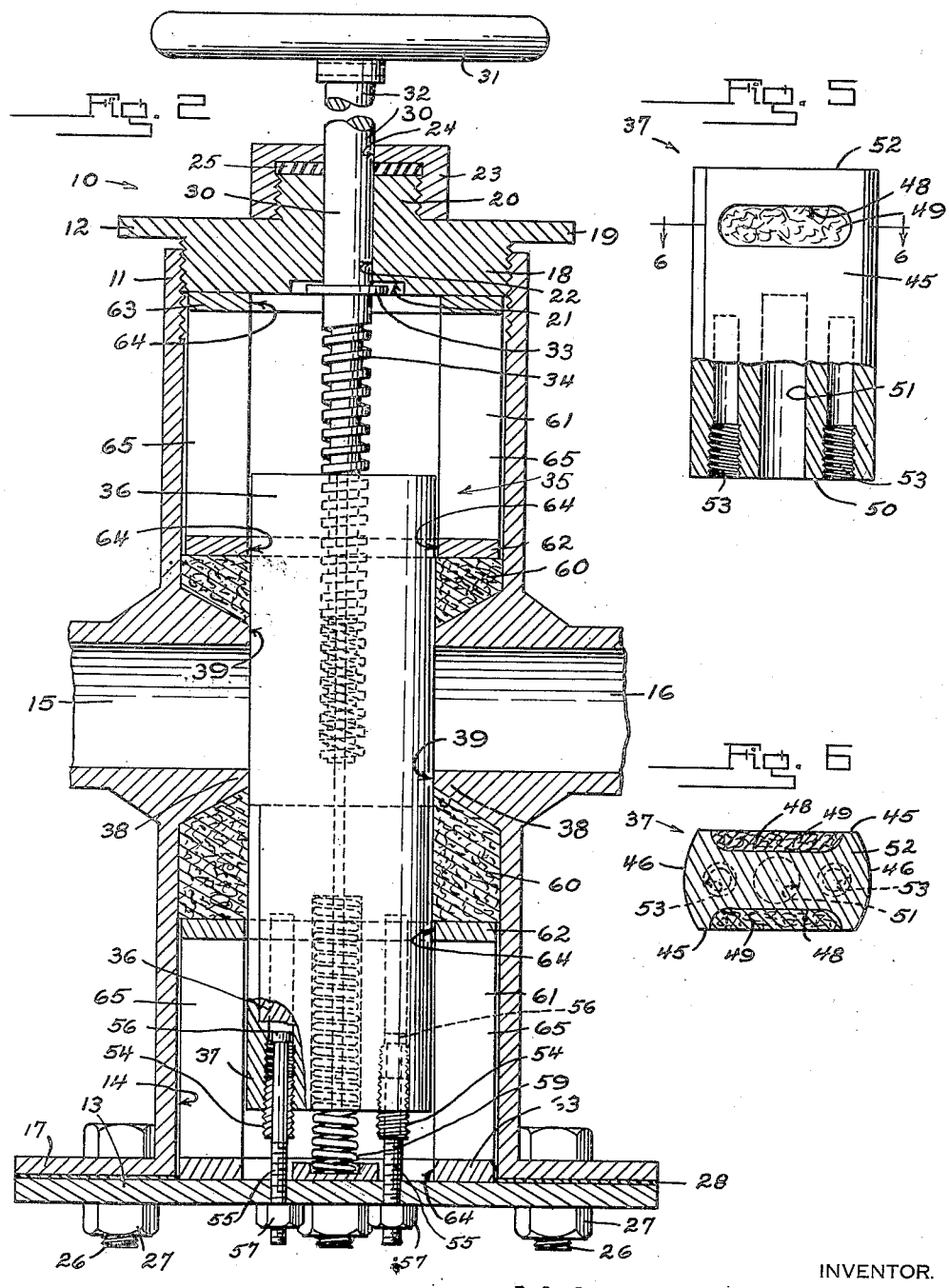

Patented Nov. 14, 1950

2,529,795

UNITED STATES PATENT OFFICE 2,529,795

VALVE

Melvin L. Bryer, Beeville, Tex.

Application September 26, 1947, Serial No. 776,172

7 Claims. (Cl. 251—62)

This invention relates to valves and more particularly to gate valves.

An important object of the invention is to provide a valve so constructed that scouring or cutting away of the interior surfaces of the valve structure by the fluid flowing through the interior thereof is substantially eliminated.

Another important object is to provide a self-lubricating valve structure.

Still another important object is to provide a gate valve structure, which comprises but few essential parts, yet is so constructed that wear is reduced, and a positive action assured.

Other objects and advantages of the invention will be apparent during the course of the following detailed description of the invention, taken in connection with the accompanying drawings, forming a part of this disclosure, and in which drawing:

Figure 1 is a vertical section of the novel valve structure with a port, having its axis normal to the plane of the exposed sectioned surface, open.

Figure 2 is a vertical section of the same, through the ports, which are closed.

Figure 3 is a horizontal section, substantially on the line 3—3 of Figure 1.

Figure 4 is a view, mostly in elevation, of one section of the valve portion of the novel valve structure.

Figure 5 is a view, mostly in elevation and Figure 6 is a view mostly in top plan of another section of the valve portion.

In the drawings, wherein for the purpose of illustration is shown a preferred embodiment of the invention, similar reference characters designate corresponding parts throughout the several views.

The novel valve structure includes a body portion 10, which may be a generally cylindrical side wall section 11, and end wall section 12 and opposite end wall section 13, all defining a valve chamber or bore 14.

Preferably, the side wall section 11 is interiorly screw-threaded at one end, has two ports 15 and 16 substantially midway its length and extending to the chamber 14, with the axes of the ports coincident, and an outwardly-extending flange 17 at its other end.

The end wall section 12 includes an exteriorly screw-threaded neck 18 which extends slightly into the chamber 14, with the screw threads thereof cooperating with the screw threads of the side wall section to detachably couple the sections 11 and 12 together, a flange 19 extending outwardly of the neck 18 and an exteriorly screw-threaded head 20. The inner surface of the neck 18 is indented by a circular recess 21 disposed about the mouth of a valve stem-receiving bore 22 which extends through the axial center of the section 12. Carried by the head 20 is an interiorly screw-threaded bonnet 23 with the last named screw threads and those of the bonnet cooperating for detachably securing the bonnet to the head 20. The bonnet has a valve-stem receiving bore 24 with its axis and that of the bore 22 coinciding. Packing 25 may be introduced into the bonnet between its outer end and the outermost end of the head 20.

For detachably securing the end wall section 13, which may be a disc, to the side wall section 11 there may be provided spaced-apart perforations in the flange 17 and section 13 through which extend the shanks of bolts 26, having nuts 27 screwed thereon with a suitable packing 28 between end wall section 13 and flange 17.

Extending through the bores 22 and 24 and outwardly thereof is a valve stem 30 having a suitable detachable handle 31 at its end 32 outwardly of the body portion 10, a peripheral flange 33 disposed within the recess 21 and a screw threaded inner end section 34 within the chamber 14. The tip of the end section 34 is disposed outwardly of the planes of the bores of the ports 15 and 16.

Carried by the valve stem 30 at its end section 34 is a valve 35, made up of the section 36, shown particularly in Figure 4 and the follower section 37, which may be seen particularly in Figures 5 and 6.

The valve section 36 may be an elongated cylindrical body, smaller in circumference than the general inner circumference of the chamber 14, but has sliding contact with a portion of the inner face of the side wall 11 at the inner ends of the ports 15 and 16, as shown in Figures 2 and 3. This sliding contact is provided by flanges 38 extending toward the longitudinal axis of the body portion 10 from the inner ends of the ports 15 and 16 and each having an inner arcuate edge face 39 in fluid-tight contact with the periphery of the section 36.

Furthermore, the valve section 36 has a screw-threaded, longitudinally-extending, axially-disposed socket 40 for receiving the screw threaded part of the end section 34 of the stem 30. This socket 40 extends short of the transverse center of the section 36 and, spaced from it, is a follower-receiving slot 41 extending to the end face 42 of the valve section 36. In the showing in Figure 3, it will be noted that the width of this slot is less than the diameter of the bore of the adjacent ports 15 and 16. The length of the slot 41 is shown as substantially one-half the length of the section 36. Extending through the section 36 from its face 42 to the opposite end face may be a pair of oil passageways 44 with their upper ends 43 opening to the upper face of the valve section 36.

Referring now mainly to Figures 5 and 6, the follower section 37 is preferably a block of suitable material having opposite parallel faces 45 in sliding contact with opposite surfaces of the walls of the slot 41, a pair of arcuate faces 46 joining the faces 45 which, when the follower section 37 is within the slot 41, will merge into the periphery of the section 36. Extending inwardly from each face 45 may be a packing-receiving recess 48, containing packing 49 extending to the adjacent face 45. Axially disposed, and extending longitudinally of the follower section 37, from its face 50, is an expansion coil spring-receiving socket 51, which falls short of the face 52 opposite the face 50. In addition, there are two substantially parallel sockets 53, screw threaded at their open end portions and disposed on either side of and paralleling the socket 51, for purposes later detailed.

Each socket 53 may adjustably carry an exteriorly screw-threaded sleeve 54 which may be short and rotated upon its screw threads and those of either socket 53 so as to adjust the position of the inner end of the sleeve with respect to the follower section 37. Extending through each sleeve 54 is an elongated member which may be the smooth-surfaced, cylindrical portion of a rod 55 with its end portions screw threaded. The inner screw-threaded end portion may carry a nut 56 which may contact the inner end of sleeve 54 and the outer screw-threaded end portion may extend through a screw-threaded opening in the end wall portion 13 as in Figure 1, protrude outwardly of that portion 13, and receive a nut 57. Thus the rods 55 may be fed toward or away from the wall portion 12, which action would also move the nuts 56 (which form abutments) toward this wall portion. The nuts or abutments 56 limit movement of the follower section 37 toward the end wall 12 so that it (the section 37) may extend to the nearest portion of the peripheries of the inner ends of the openings through the flanges 38 and, consequently, will not close the ports 15 and 16. However it is apparent that the section 37 may move toward the end wall 13 upon movement of the valve section 36 toward that end wall, when the section 36 is moved to close the ports.

Means to normally urge the follower section 37 toward the end wall 12 may be an expansion coil spring 59 with one end bearing against the end wall 13 and its other end bearing against the end wall of the socket 51.

Over the outer surfaces of the flanges 38, the adjacent inner surface of the side wall 11 and the adjacent outer surface of the valve section 36 is packing 60 held in fluid-tight engagement with those surfaces by a pair of compressor members 61. Each member 61 may comprise a pair of spaced-apart discs 62 and 63 each having a valve-receiving opening 64 and connected by spacers 65 which may be integral therewith. The discs 62 bear against the packing 60 and the discs 63 engage the inner face of the neck 18 and the inner face of the end wall 13.

It should be observed that the rods 55 prevent rotation of the valve section 37 and hence the latter prevents rotation of the valve section 36, whereby the rods 55 have a dual function.

Of course the valve section 37 may be adjusted, by manipulation of the screw-threaded sleeves 54, and the nuts 56 at the inner ends of the rods 55 whereby the section 37 will rise and normally partly close the ports thus restricting the flow. However, this will not interfere with complete closure of the ports by the section 36. Consequently, a predetermined flow, less than normal, may be had, with the section 36 moved to the limit of movement toward the end wall 12, and no careful adjustment of the position of the valve stem need be made each time the valve is moved from closed to open positions to provide a predetermined restricted flow.

The construction and arrangement of valve, packing and housing is such that lubricating oil will not mingle with the fluid passing through the valve. Obviously by screwing the end wall 12 toward the end wall 13 will tend to compress the packing 60.

What is claimed is:

1. In a valve, the combination with a valve structure wall, having a pair of axially aligned ports, a valve assembly including a cylindrical gate section having end walls and an arcuate side wall and an elongated slot extending from the the end wall, toward the opposite end wall and falling short of this opposite end wall, providing a slot bottom disposed outwardly of the planes of said ports when said valve is open, said slot opening into said side walls and having its longitudinal axis intersecting the axes of said ports, a follower section, slidably carried by the gate section, having a slot bottom-facing surface and a face facing said valve structure wall, means urging said follower section longitudinally along said slot toward said slot bottom, means preventing rotation of said gate section with respect to said follower section, and means limiting movement of said follower section toward said slot bottom, whereby a fluid passageway is provided defined by said ports, said slot bottom, said surface and the adjacent portions of the walls of said slot adjacent and extending to said slot bottom, said last-named means, in conjunction with said valve structure wall, said follower and the walls of said slot, also preventing rotation of said follower section with respect to said gate section and said valve structure wall.

2. In a valve, the combination with a valve structure wall, having a pair of axially-aligned ports, a valve assembly including a gate section having end and side walls and an elongated slot extending from the end wall, toward the opposite end wall and falling short of this opposite end wall, providing a slot bottom disposed outwardly of the planes of said ports when said valve is open, said slot opening into said side walls and having its longitudinal axis intersecting the axes of said ports, a follower section, slidably carried by the gate section, having a slot bottom-facing surface and a face facing said valve structure wall, means urging said follower section longitudinally along said slot toward said slot bottom, means preventing rotation of said gate section with respect to said follower section, and means limiting movement of said follower section toward said slot bottom, whereby a fluid passageway is provided defined by said ports, said slot bottom, said surface and the adjacent portions of the walls of said slot adjacent and extending to said slot bottom, said last-named means, in conjunction with said valve structure wall, said follower and the walls of said slot, also preventing rotation of said follower section with respect to said gate section and said valve structure wall and including the walls of a pair of spaced-apart sockets extending into said follower section from said face thereof, a pair of spaced-apart, parallel, elongated members fixed to said valve structure wall and extending into said sockets, said elongated members having enlargements upon their ends within said sockets, and means providing abutments for said enlargements disposed in said sockets between said enlargements and the mouths of said sockets.

3. In a valve, the combination with a valve structure wall, having a pair of axially-aligned ports, a valve assembly including a gate section having end and side walls and an elongated slot extending from the end wall, toward the opposite end wall and falling short of this opposite end wall, providing a slot bottom disposed outwardly of the planes of said ports when said valve is open, said slot opening into said side walls and having its longitudinal axis intersecting the axes of said ports, a follower section, slidably carried by the gate section, having a slot bottom-facing surface and a face facing said valve structure wall, means urging said follower section longitudinally along said slot toward said slot bottom, means preventing rotation of said gate section with respect to said follower section, and means limiting movement of said follower section toward said slot bottom, whereby a fluid passageway is provided defined by said ports, said slot bottom, said surface and the adjacent portions of the walls of said slot adjacent and extending to said slot bottom, said last-named means, in conjunction with said valve structure wall, said follower and the walls of said slot, also preventing rotation of said follower section with respect to said gate section and said valve structure wall and including the walls of a pair of spaced-apart sockets extending into said follower section from said face thereof, a pair of spaced-apart, parallel, elongated members fixed to said valve structure wall and extending into said sockets, said elongated members having enlargements upon their ends within said sockets, and means providing abutments for said enlargements disposed in said sockets between said enlargements and the mouths of said sockets, said last-named means comprising a sleeve for each socket, each sleeve having an inner abutment end within its socket and adjustably carried by said follower section for adjustment longitudinally of said sockets, with portions of the surfaces of said elongated members in sliding contact with the inner surfaces of said sleeves.

4. In a valve structure, a cylindrical valve housing having a pair of ports at opposite sides thereof and outer walls spaced from the ports and facing each other; a valve within the housing comprising a first cylindrical section and a second section, said first section being elongated, having an arcuate side face and end faces and having an elongated slot extending longitudinally thereof opening into said side face and one end face, said slot being constructed and arranged to align with said ports when said first valve section is in one position, said second valve section being disposed partly within said slot, at the open-end portions thereof, at all times and in longitudinally sliding contact with opposite walls of the slot; means to prevent rotation of said first section with respect to said second section; means to urge said second section longitudinally of said slot toward said first section; and means to limit movement of said second section longitudinally of said slot and to prevent, in conjunction with said valve housing, rotation of said second section, whereby the prevention of rotation of said second section will prevent rotation of said first section.

5. In a valve structure, a valve housing having a pair of ports at opposite sides thereof and outer walls spaced from the ports and facing each other; a valve within the housing comprising a first section and a second section, said first section being elongated, having a side face and end faces, and having an elongated slot extending longitudinally thereof opening into said side face and one end face, said slot being constructed and arranged to align with said ports when said first valve section is in one position, said second valve section being disposed partly within said slot, at the open-end portions thereof, at all times and in longitudinally sliding contact with opposite walls of the slot; means to prevent rotation of said first section with respect to said second section; means to urge said second section longitudinally of said slot toward said first section; and means to limit movement of said second section longitudinally of said slot and to prevent in conjunction with said valve housing, rotation of said second section, whereby the prevention of rotation of said second section will prevent rotation of said first section, said last-named means being carried by one of said outer walls and by said second section.

6. In a valve structure, a valve housing having a pair of ports at opposite sides thereof and outer walls spaced from the ports and facing each other; a valve within the housing comprising a first section and a second section, said first section being elongated, having a side face and end faces and having an elongated slot extending longitudinally thereof opening into said side face and one end face, said slot being constructed and arranged to align with said ports when said first valve section is in one position, said second valve section being disposed partly within said slot, at the open-end portions thereof, at all times and in longitudinally sliding contact with opposite walls of the slot; means to prevent rotation of said first section with respect to said second section; means to urge said second section longitudinally of said slot toward said first section; and means to limit movement of said second section longitudinally of said slot and to prevent rotation of said second section, whereby the prevention of rotation of said second section will prevent rotation of said first section, said last-named means including the walls of a pair of spaced-apart sockets extending into said second section from an end of said second section, a pair of spaced-apart elongated members fixed to one of said outer walls and extending into said sockets, said elongated members having enlargements upon their ends within said sockets, and means providing abutments for said enlargements disposed in said sockets between said enlargements and the mouths of said sockets.

7. In a valve structure, a valve housing having a pair of ports at opposite sides thereof and outer walls spaced from the ports and facing each other; a valve within the housing comprising a first section and a second section, said first section being elongated, having a side face and end faces and having an elongated slot extending longitudinally thereof opening into said side face and one end face, said slot being constructed and arranged to align with said ports when said first valve section is in one position, said second valve section being disposed partly within said slot, at the open-end portions thereof, at all times and in longitudinally sliding contact with opposite walls of the slot; means to prevent rotation of said first section with respect to said second section; means to urge said second section longitudinally of said slot toward said first section; and means to limit movement of said second section longitudinally of said slot and to prevent rotation of said second section, whereby the preventation of rotation of said second section will prevent rotation of said first section, said last-named means including the walls of a pair of spaced-apart sockets extending into said second section from an end of said second section, a pair of spaced-apart elongated members fixed to one of said outer walls and extending into said sockets, said elongated members having enlargements upon their ends within said sockets, and means providing abutments for said enlargements disposed in said sockets between said enlargements and the mouths of said sockets, said last-named means comprising a sleeve for each socket, each sleeve having an inner abutment end within its socket and adjustably carried by said second section for adjustment longitudinally of said sockets, with portions of the surfaces of said elongated members in sliding contact with the inner surfaces of said sleeves.

MELVIN L. BRYER.

REFERENCES CITED

The following references are of record in the file of this patent:

UNITED STATES PATENTS

| Number | Name | Date |
| --- | --- | --- |
| 1,675,986 | Mason | July 3, 1928 |